(12) United States Patent
Sugiura et al.

(10) Patent No.: US 10,555,396 B1
(45) Date of Patent: Feb. 4, 2020

(54) LIGHT EMITTING DEVICE AND PRODUCTION METHOD THEREFOR

(71) Applicant: TOYODA GOSEI CO., LTD., Kiyosu-shi (JP)

(72) Inventors: Yasutsugu Sugiura, Kiyosu (JP); Taro Isogai, Kiyosu (JP); Kazuki Yabashi, Kiyosu (JP)

(73) Assignee: TOYODA GOSEI CO., LTD., Kiyosu-Shi, Aichi-Ken (JP)

( * ) Notice: Subject to any disclaimer, the term of this patent is extended or adjusted under 35 U.S.C. 154(b) by 0 days.

(21) Appl. No.: 16/534,620

(22) Filed: Aug. 7, 2019

(30) Foreign Application Priority Data

Sep. 26, 2018 (JP) .................. 2018-180263
Sep. 27, 2018 (JP) .................. 2018-181805

(51) Int. Cl.
*H05B 33/08* (2006.01)
*B60Q 3/16* (2017.01)
*B60Q 3/80* (2017.01)
*B60Q 3/217* (2017.01)

(52) U.S. Cl.
CPC ............. *H05B 33/086* (2013.01); *B60Q 3/80* (2017.02); *H05B 33/0815* (2013.01); *B60Q 3/16* (2017.02); *B60Q 3/217* (2017.02)

(58) Field of Classification Search
CPC ............... H05B 33/08; H05B 33/0815; H05B 33/0842; H05B 33/0845; H05B 33/0854; H05B 33/0863; H05B 33/086; H05B 37/02; B60Q 3/80; B60Q 3/16; B60Q 3/217
See application file for complete search history.

(56) References Cited

U.S. PATENT DOCUMENTS

| 8,794,808 | B2 | 8/2014 | Otsubo et al. |
| 9,674,918 | B2 | 6/2017 | Seki |
| 2010/0225241 | A1* | 9/2010 | Maehara ............... H05B 33/086 315/250 |
| 2012/0182753 | A1 | 7/2012 | Otsubo et al. |
| 2013/0057155 | A1 | 3/2013 | Branchetti et al. |
| 2016/0205741 | A1 | 7/2016 | Seki et al. |

FOREIGN PATENT DOCUMENTS

| JP | 2012-146601 A | 8/2012 |
| JP | 2013-519985 A | 5/2013 |
| JP | 2016-129130 A | 7/2016 |
| JP | 2017-139404 A | 8/2017 |

* cited by examiner

*Primary Examiner* — Jimmy T Vu
(74) *Attorney, Agent, or Firm* — McGinn IP Law Group, PLLC

(57) ABSTRACT

A light emitting device, which includes a plurality of light emitting elements each having a different chromaticity of emission light, to emit mixed light produced by mixing the respective emission light of the plurality of light emitting elements together, includes a receiving section to obtain command information on the mixed light, a driving section to perform a PWM drive on the plurality of light emitting elements on the basis of the command information, and a storing section to store correction information to be set on the basis of measurement results on the respective emission light of the plurality of light emitting elements. The driving section is being configured in such a manner as to, on the basis of the correction information, correct a duty ratio in the PWM drive to be set in accordance with the command information, and perform the PWM drive on the plurality of light emitting elements.

10 Claims, 8 Drawing Sheets

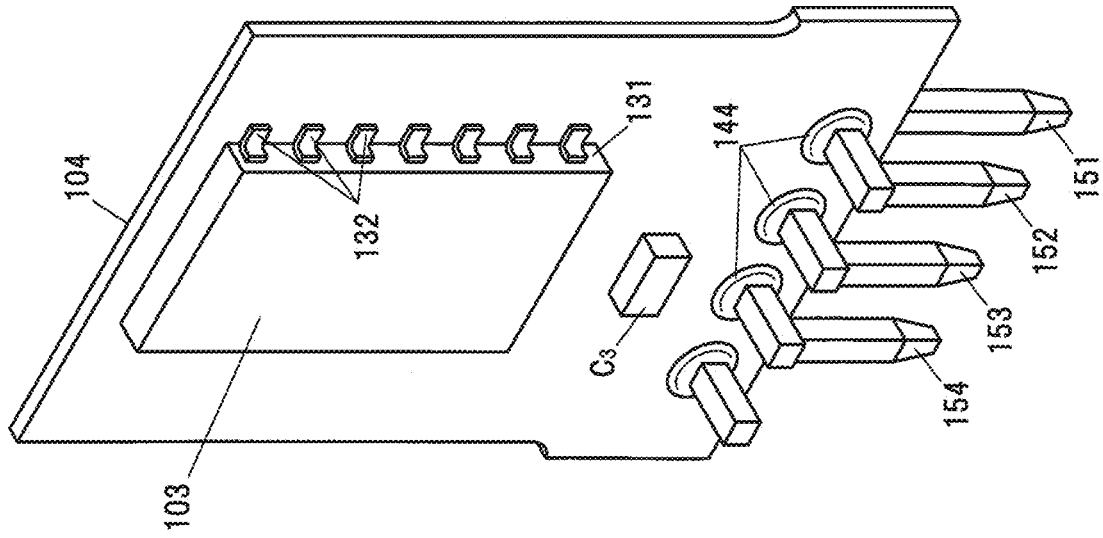
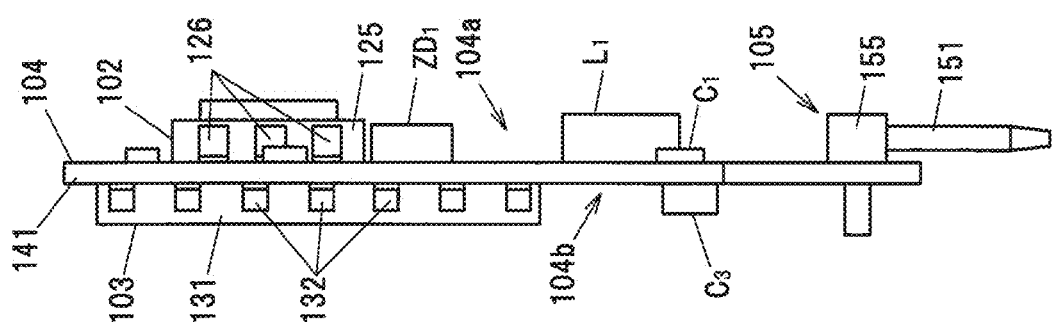
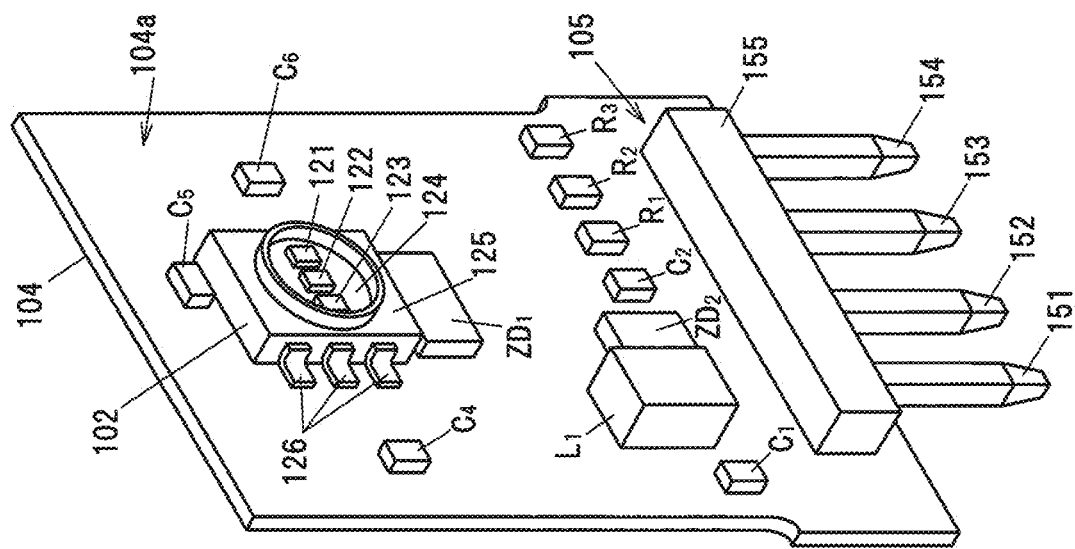

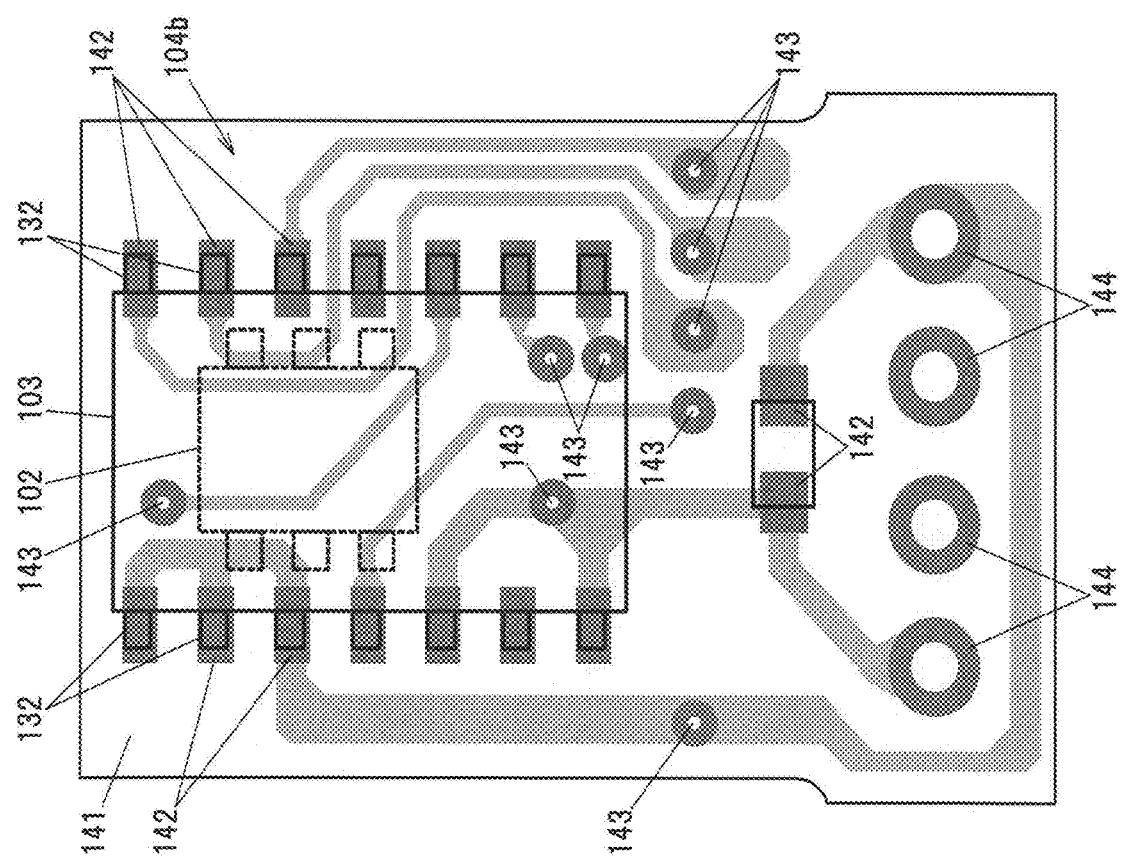
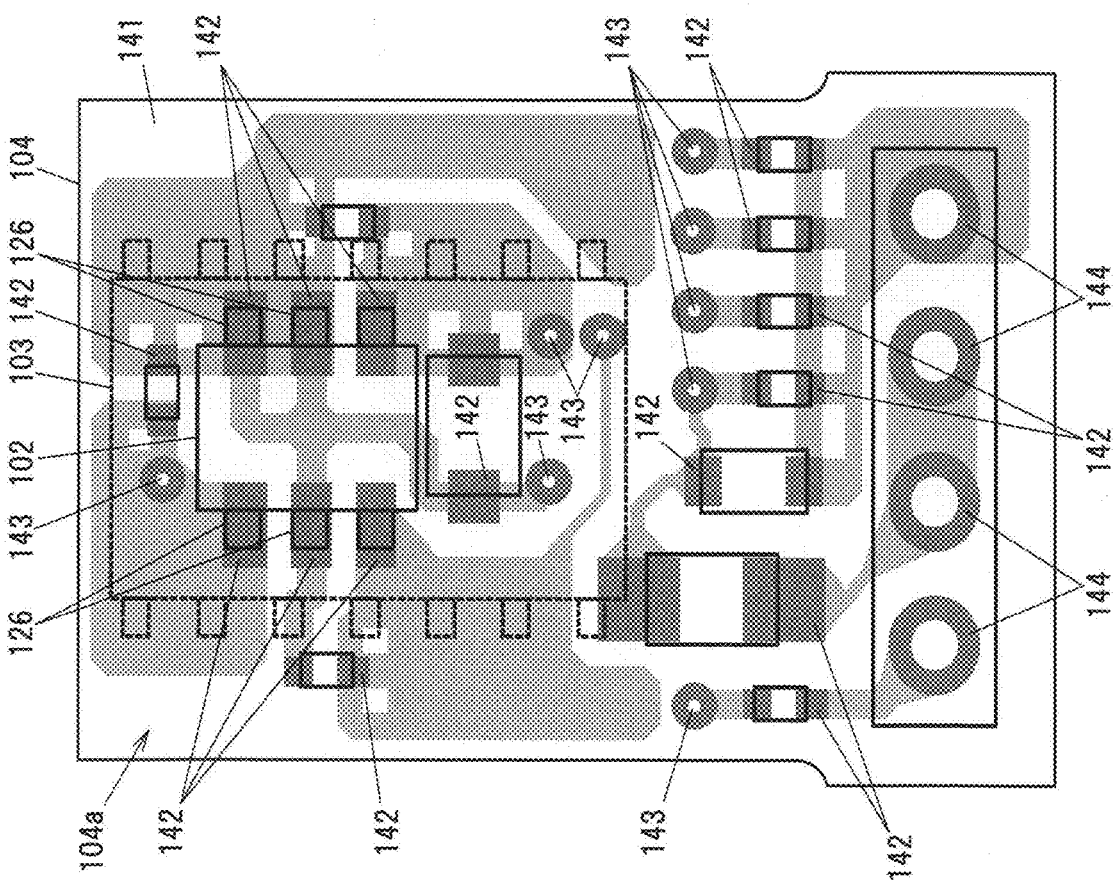

LIGHT EMITTING DEVICE AND PRODUCTION METHOD THEREFOR

BACKGROUND OF THE INVENTION

1. Field of the Invention

The present invention relates to a light emitting device and a production method therefor, which are designed to emit mixed light produced by mixing together respective emission light of a plurality of light emitting elements each having a different chromaticity of emission light.

2. Description of the Related Art

Conventionally, there is known a light emitting device that includes a plurality of light emitting elements each having a different chromaticity of emission light, and which is able to change a color shade of mixed light by controlling a respective brightness of each of the plurality of light emitting elements. The control of the respective brightness of each of the plurality of light emitting elements is achieved by changing a duty ratio in a light emitting element driving PWM (pulse width modulation) signal, for example (see Patent Documents 1 and 2, for example).
[Patent Document 1] JP-A-2013-519985
[Patent Document 2] JP-A-2016-129130

SUMMARY OF THE INVENTION

A plurality of the light emitting devices as described above may be used in combination. For example, a vehicle interior illumination device for a vehicle (an automobile) may be configured in such a manner that light emitting devices are attached to left-hand and right-hand side doors and a front panel (instrument panel), respectively, of that vehicle, with those light emitting devices to emit light of the same colors respectively. In such a case, a difference between the respective color shades of the light emitted from those light emitting devices occurs, which may lead to a lowering in design quality.

Accordingly, it is an object of the present invention to provide a light emitting device and a production method therefor, which are designed to be able to suppress the occurrence of a variation in color shade of mixed light produced by mixing together respective emission light of a plurality of light emitting elements each having a different chromaticity of emission light.

For the purpose of achieving the above object, one aspect of the present invention provides light emitting devices and production methods therefor defined by [1] to [10] below.

[1] A light emitting device, which includes a plurality of light emitting elements each having a different chromaticity of emission light, to emit mixed light produced by mixing the respective emission light of the plurality of light emitting elements together, comprising: a receiving section to obtain command information on the mixed light; a driving section to perform a PWM drive on the plurality of light emitting elements on the basis of the command information; and a storing section to store correction information to be set on the basis of measurement results on the respective emission light of the plurality of light emitting elements, wherein the driving section is being configured in such a manner as to, on the basis of the correction information, correct a duty ratio in the PWM drive to be set in accordance with the command information, and perform the PWM drive on the plurality of light emitting elements.

[2] The light emitting device according to [1] above, wherein the plurality of light emitting elements include at least three light emitting elements each having a different chromaticity of emission light, and the storing section is being configured in such a manner as to store the correction information for each of colors of the mixed light to be emitted.

[3] The light emitting device according to [1] or [2] above, wherein the correction information is to be measured by using the driving section in conjunction with the plurality of light emitting elements.

[4] A light emitting device producing method, which is designed to emit mixed light produced by mixing together respective emission light of a plurality of light emitting elements each having a different chromaticity of emission light, comprising: a first step of producing the plurality of light emitting elements; a second step of measuring the respective emission light of the plurality of light emitting elements produced, and setting correction information on the basis of results on that measurement; and a third step of storing the correction information in a storing section configured to be able to be accessed by a driving section configured to drive the plurality of light emitting elements.

[5] The light emitting device producing method according to [4] above, wherein the plurality of light emitting elements include at least three light emitting elements each having a different chromaticity of emission light, and the second step is performed to set the correction information for each of colors of the mixed light to be emitted.

[6] The light emitting device according to any one of [1] to [5] above, further comprising: a light emitting module, which is being mounted with the plurality of light emitting elements thereon; a driving IC, which includes the receiving section, the driving section, and the storing section; and a printed circuit board, which is being mounted with the light emitting module and the driving IC thereon, wherein the light emitting module is being mounted on a first mounting surface of the printed circuit board, while the driving IC is being mounted on a second mounting surface of the printed circuit board corresponding to a back side of that first mounting surface.

[7] The light emitting device according to [6] above, wherein the light emitting module and the driving IC are being arranged in such a manner that their respective lead terminals are not overlapped on front and back sides of the printed circuit board.

[8] The light emitting device according to [6] or [7] above, wherein the printed circuit board includes a plurality of through hole vias, which are connecting a wiring pattern on the first mounting surface and a wiring pattern on the second mounting surface together, in such a manner that the plurality of through hole vias are not being provided in a region of the first mounting surface lying opposite the light emitting module.

[9] The light emitting device according to any one of [6] to [8] above, wherein a wiring pattern on the first mounting surface, which is being connected by soldering to a lead terminal of the light emitting module, is being formed in a planar shape up to an outer side of a region corresponding to a back side of the driving IC.

[10] The light emitting device according to any one of [6] to [9] above, wherein the light emitting module is being reflow soldered to the first mounting surface after reflow soldering of the driving IC to the second mounting surface, in such a manner that a temperature at which the light emitting module is soldered to the first mounting surface is set at lower than a temperature at which the driving IC is soldered to the second mounting surface.

Points of the Invention

The light emitting devices and the production methods therefor according to the present invention make it possible to suppress the occurrence of a variation in color shade of the mixed light.

BRIEF DESCRIPTION OF THE DRAWINGS

FIG. 6A is a perspective view showing a light emitting device according to a second embodiment of the present invention;

FIG. 6B is a side view showing the light emitting device according to the second embodiment;

FIG. 6C is a perspective view showing the light emitting device according to the second embodiment;

FIG. 8A is a plan view showing a wiring pattern on a first mounting surface of a printed circuit board; and FIG. 8B is a plan view showing a wiring pattern on a second mounting surface when viewed through a base member from a first mounting surface side.

DETAILED DESCRIPTION OF THE PREFERRED EMBODIMENTS

First Embodiment

Figure 1:
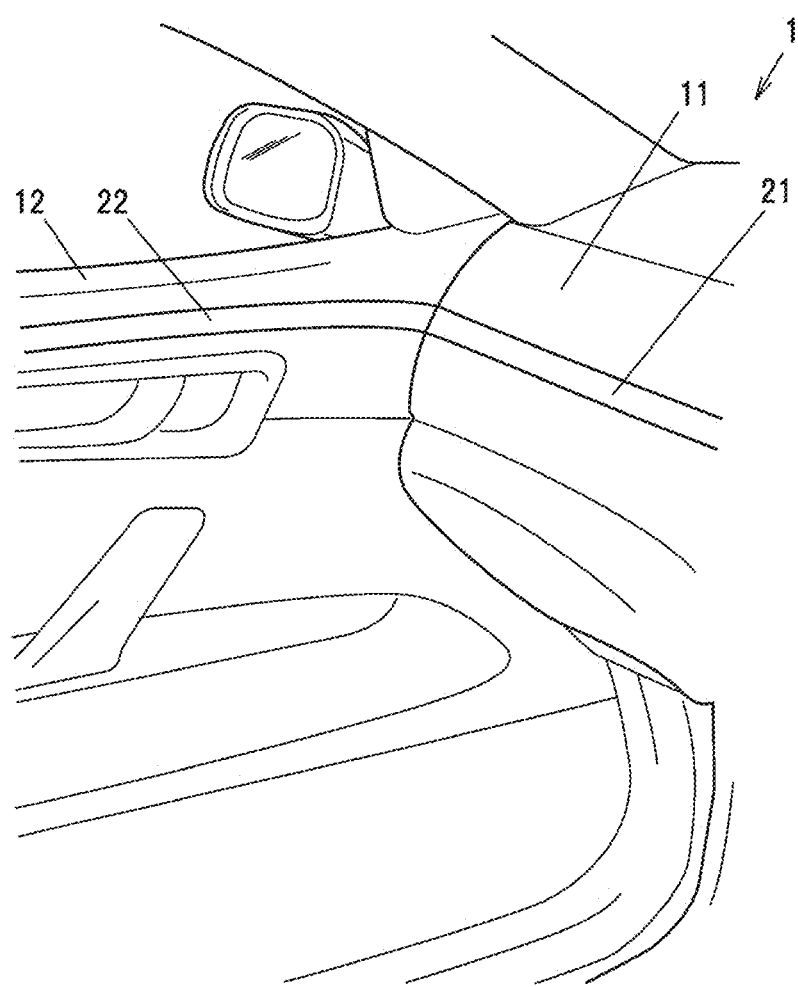
FIG. 1 is a configuration diagram showing one example of a vehicle interior of a vehicle with a light emitting device according to a first embodiment of the present invention attached thereto.
Figure 2A:
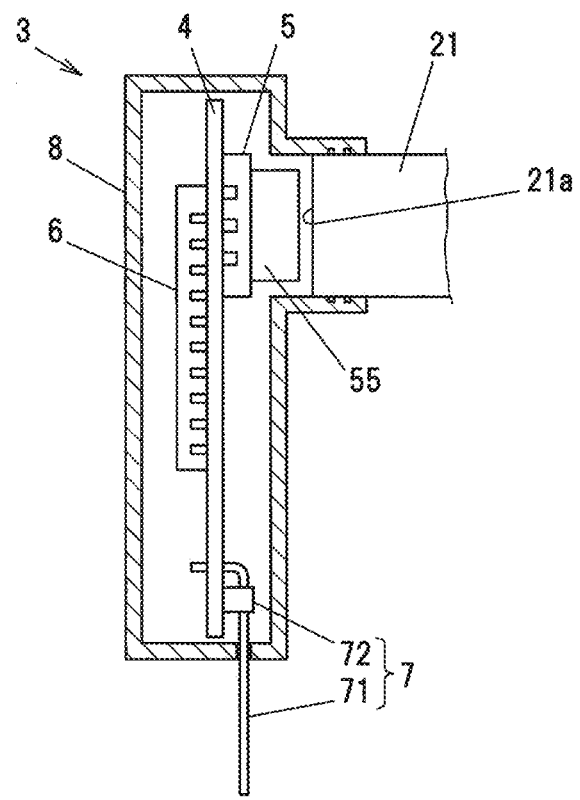
FIG. 2A is a configuration diagram showing the light emitting device according to the first embodiment.
Figure 2B:
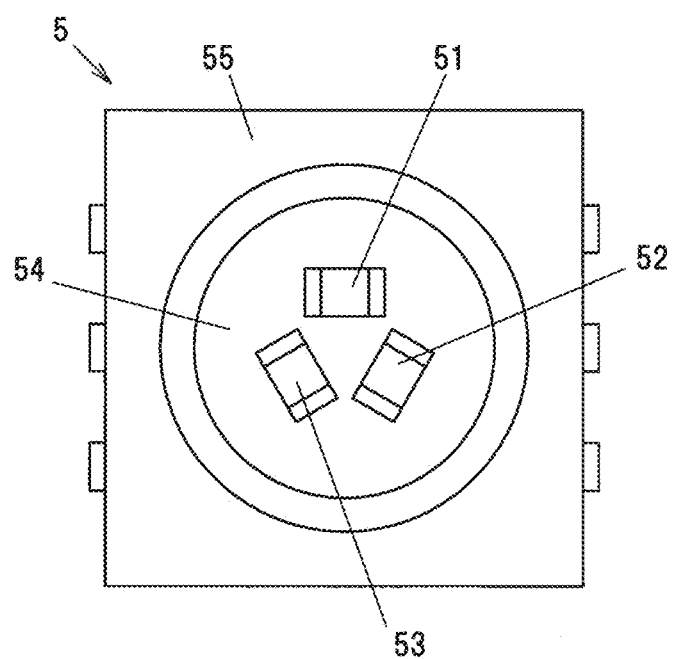
FIG. 2B is a front view showing a light emitting module of the light emitting device.

FIG. 1 is a configuration diagram showing one example of a vehicle interior of a vehicle with a light emitting device according to a first embodiment of the present invention attached thereto. FIG. 2A is a configuration diagram showing the light emitting device according to the first embodiment, and FIG. 2B is a front view showing a light emitting module of the light emitting device.

As shown in FIG. 1, a vehicle 1 is being configured to include a first light guide rod 21, which is being attached to a front panel 11 of that vehicle 1, and a second light guide rod 22, which is being attached to a left-hand side door 12 of that vehicle 1. Note that a third light guide rod, which is provided separately from the first and second light guide rods 21 and 22, is being attached to a right-hand side door not shown of the vehicle 1 as well.

Light emitting devices 3 are being attached to the front panel 11 and the left-hand side door 12 respectively, and being configured in such a manner that the light emitting device 3 being attached to the front panel 11 emits light to the first light guide rod 21, while the light emitting device 3 being attached to the left-hand side door 12 emits light to the second light guide rod 22. In FIG. 2A, the light emitting device 3 being arranged in association with the first light guide rod 21 is being illustrated as an example.

The first light guide rod 21 and the second light guide rod 22 are being attached in such a manner as to form a series of straight lines and exhibit a feeling of oneness, with the left-hand side door 12 being closed as shown in FIG. 1. As the first light guide rod 21 and the second light guide rod 22, it is possible to use a rod configured to include a core layer of a predetermined refractive index made of an acrylic based resin and a cladding layer made of a fluorine based resin, and emit light of a uniform intensity in a longitudinal direction of that rod from a vehicle interior side emission surface, for example.

A user such as a driver and the like is able to select colors of the light to be emitted from the first light guide rod 21 and the second light guide rod 22 by touch operation on a touch panel display of a car navigation system, for example. The selected light color information is transmitted to the light emitting devices 3 of each part via an in-vehicle network using a CAN (controller area network), an LIN (local interconnect network) or the like, for example. The light emitting devices 3 of each part are being configured to emit light of the same colors respectively, and the first light guide rod 21 and the second light guide rod 22 are being configured to disperse and emit those light in their longitudinal directions, respectively.

Figure 3:
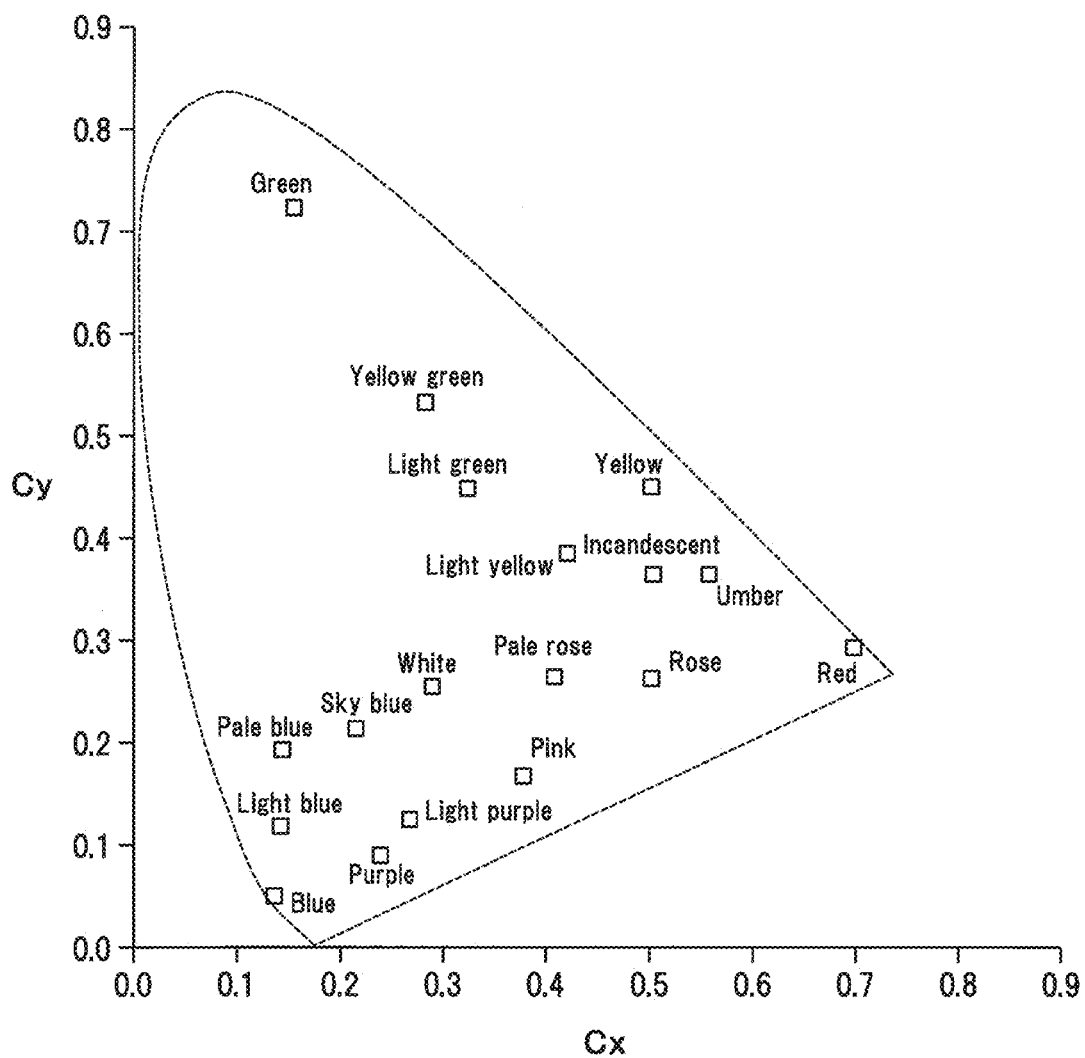
FIG. 3 is a CIE 1931 chromaticity diagram showing one example of a plurality of selection colors to be able to be selected by a user.

FIG. 3 is a CIE 1931 chromaticity diagram showing one example of a plurality of selection colors to be able to be selected by the user. As shown in FIG. 3, the light emitting devices 3 are capable of emitting light of 16 chromatic colors with different chromaticity coordinates (Cx, Cy), such as yellowish green, light purple, and the like, besides white. Next, a configuration of the light emitting devices 3 will be described. Note that, although the configuration of the light emitting device 3 being arranged in association with the first light guide rod 21 is described below as an example, the light emitting device 3 being arranged in association with the second light guide rod 22 is being configured in the same manner.

(Configuration Example of the Light Emitting Device 3)

As shown in FIG. 2A, the light emitting device 3 is being configured to include a substrate 4, which is being formed with wiring patterns on surfaces of a base member such as a glass epoxy or the like, a light emitting module 5 and a driving IC (integrated circuit) 6, which are being mounted on the substrate 4, a connector 7, in which a plurality of connector pins 71, which are being attached to an end portion of the substrate 4, are being held by a holding member 72, and a case 8, which is accommodating the substrate 4 together with the light emitting module 5 and the driving IC 6. The plurality of connector pins 71 are being led out from an opening of the case 8.

The light emitting module 5 is being configured to include a plurality of light emitting elements each having a different chromaticity of emission light. In the present embodiment, as shown in FIG. 2B, the light emitting module 5 is being configured to include a first light emitting element 51, which is being configured to emit red light, a second light emitting element 52, which is being configured to emit green light, a third light emitting element 53, which is being configured to emit blue light, an element substrate 54, which is being mounted with those first to third light emitting elements 51 to 53 thereon, and a housing 55, which is accommodating the first to third light emitting elements 51 to 53 and the element substrate 54.

The first to third light emitting elements 51 to 53 are being configured as LEDs (Light Emitting Diodes), and being arranged opposite an incidence plane 21a of the first light guide rod 21. Respective light emitted from the first to third light emitting elements 51 to 53 are passed through the incidence plane 21a into the first light guide rod 21. The first to third light emitting elements 51 to 53, on receiving a driving current to be supplied from the driving IC 6, emit their respective light, and the light emitting device 3 emits mixed light produced by mixing the respective emission light of the first to third light emitting elements 51 to 53 together.

Figure 4:
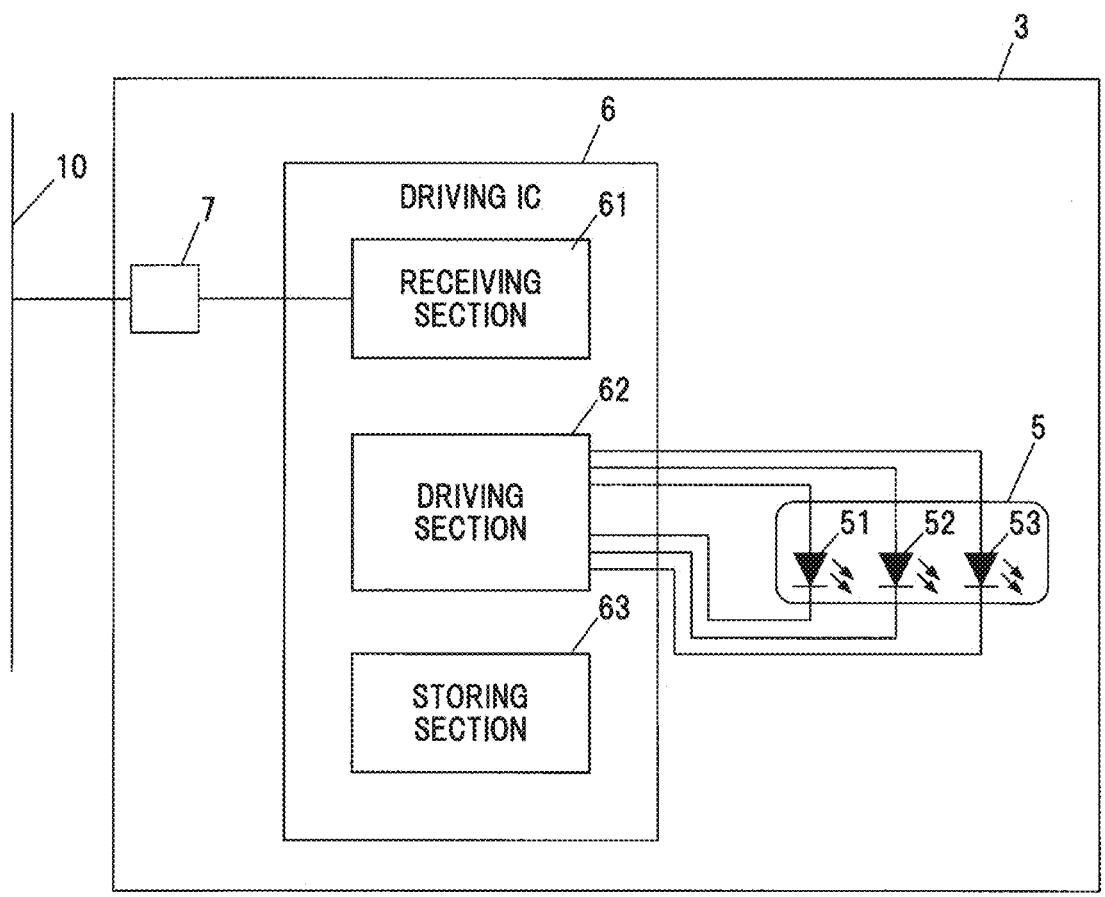
FIG. 4 is a block diagram showing an electric circuit of a light emitting module and a function configuration of a driving IC.

FIG. 4 is a schematic view showing an electric circuit of the light emitting module 5 and a function configuration of the driving IC 6. The driving IC 6 is being configured to include a receiving section 61 to obtain command information on the mixed light via an in-vehicle network 10, a driving section 62 to perform a PWM (pulse width modulation) drive on the first to third light emitting elements 51 to 53 on the basis of that command information obtained by the receiving section 61, and a storing section 63 to store correction information to be set in production of the light emitting device 3.

The receiving section 61 is being configured to obtain the command information on the mixed light via the in-vehicle network 10 and the connector 7. The command information to be obtained by the receiving section 61 is the information indicating a color of the light to be emitted by the light emitting device 3. The receiving section 61 is being configured to obtain the command information at a predetermined time interval, for example. The driving section 62 is being configured to be able to access the storing section 63 via a data bus formed on the substrate 4, for example, and on the basis of the correction information stored in the storing section 63, correct a duty ratio in the PWM drive to be set in accordance with the command information, and perform the PWM drive on the first to third light emitting elements 51 to 53.

The brightnesses of the first to third light emitting elements 51 to 53 become higher as the duty ratio in the PWM drive, i.e., the proportion of a period of time for which the driving current is being supplied within a unit time is higher. At a duty ratio of 100%, the driving current is constantly being supplied, while at a duty ratio of 0%, no driving current is supplied.

Here, the duty ratio correction is required because inevitable variations (manufacturing variations) in properties of the first to third light emitting elements 51 to 53 occur in production. That is, even when the same driving current is supplied to the light emitting elements produced on the same manufacturing line, the brightness and the color shade slightly differ for each of the individual light emitting elements. Since the light emitting devices 3 emit their respective mixed light produced by mixing together the respective emission light of their respective first to third light emitting elements 51 to 53 each having a different chromaticity of emission light, if no duty ratio correction is performed, the synergistic action of the above-mentioned manufacturing variations may lead to such a difference between the respective color shades of the respective mixed light emitted from the light emitting devices 3 as to be able to be perceived by the user. In particular, when the respective light emitted from the different light emitting devices 3 are passed through the first light guide rod 21 and the second light guide rod 22, respectively, arranged adjacent to each other as described above, the difference between the respective color shades thereof is highly likely to be perceived.

(Light Emitting Device 3 Producing Method)

Next, a light emitting device 3 producing method will be described. The light emitting device 3 is produced by a first step of producing the first to third light emitting elements 51 to 53, a second step of measuring the respective emission light of the first to third light emitting elements 51 to 53 produced in the first step, and setting correction information on the basis of results on that measurement, and a third step of storing the correction information set in the second step in the storing section 63 of the driving IC 6. The first step is performed by using a well-known semiconductor producing process, so the description thereof is omitted, and the second and third steps will be described in detail below.

Figure 5:
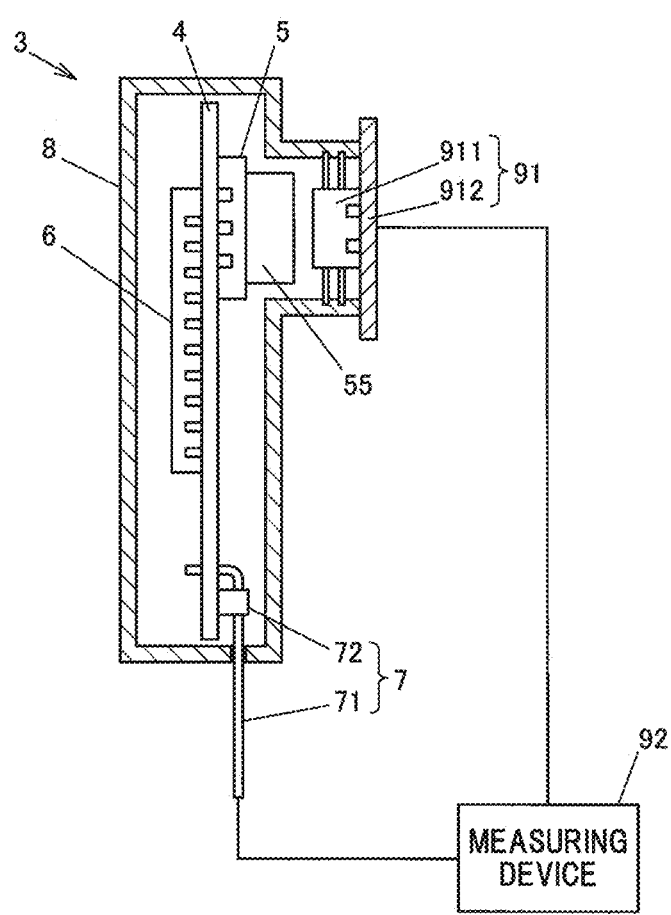
FIG. 5 is an explanatory view showing the light emitting device together with a light receiving portion and a measuring device when respective emission light of first to third light emitting elements are measured in a second step.

FIG. 5 is an explanatory view showing the light emitting device 3, together with the light receiving portion 91 and the measuring device 92, when the respective emission light of the first to third light emitting elements 51 to 53 are measured in the second step. This measurement is performed by receiving the respective emission light of the first to third light emitting elements 51 to 53 with the light receiving portion 91, with the substrate 4 mounted with the light emitting module 5 and the driving IC 6 being accommodated in the case 8. The light receiving portion 91 is being configured to include a light receiving module 911, which includes a plurality of light receiving elements in association with each color of three primary colors, for example, and a substrate 912, which is mounted with that light receiving module 911 thereon. The measurement of the emission light is performed, with external light being intercepted by bringing the substrate 912 contiguous to a cylindrical portion 552 of the housing 55, for example.

The measuring device 92 is capable of communication with the driving IC 6 via the connector 7, and is able to obtain the measurement results in the light receiving module 911. The measurement of the emission light is performed for each of the mixed colors (for example, the above-mentioned white and 16 chromatic colors) to be able to be selected by the user, for example. Specifically, each mixed color is produced in accordance with a command from the measuring device 92, and an error between a color shade measured by the light receiving module 911 and a color shade of a target value is measured by the measuring device 9, and on the basis of a measurement result on that error, the correction information is set in such a manner as to eliminate that error.

The correction information set in the measuring device 92 is sent to the driving IC 6 by communication, and stored in the storing section 63. The storing section 63 stores the correction information in a non-volatile memory such as a flash memory or the like. That is, the storing section 63 stores the correction information for each of the colors of the mixed light to be emitted. Note that since this correction information is based on the measurement results obtained on the respective emission light of the first to third light emitting elements 51 to 53 created by using the driving IC 6 in conjunction with the light emitting module 5 in each of the individual light emitting devices 3, this correction information is being designed to allow for the manufacturing variations in the driving IC 6 as well.

(Operation of the Light Emitting Device 3)

The driving IC 6 of the light emitting device 3 mounted in the vehicle obtains the command information on the color of the light selected by the user with the receiving section 61 via the in-vehicle network 10. The driving section 62 computes a reference value of the duty ratio in the driving current of each of the first to third light emitting elements 51 to 53 in accordance with the command information obtained by the receiving section 61.

Further, on the basis of the correction information stored in the storing section 63, the driving section 62 corrects the reference values of the duty ratios to be set in accordance with the command information, and performs the PWM drive on the first to third light emitting elements 51 to 53. For example, when the yellow green light is emitted in the above described second step, if its red value is greater than its target value, since the correction information is set to decrease the duty ratio for the first light emitting element 51 (or increase the duty ratios for the second and third light emitting elements 52 and 53) during the yellow green light emission, by correcting the duty ratios for the first to third light emitting elements 51 to 53 on the basis of that correction information in use in the vehicle 1, the mixed color light of a color shade having a near target value is emitted from the light emitting device 3. This makes it possible to suppress the occurrence of a difference between the color shade of the light emitted from the first light guide rod 21 and the color shade of the light emitted from the second light guide rod 22, for example.

Advantageous Effects of the First Embodiment

Since the light emitting device 3 according to the first embodiment described above, on the basis of the correction information set on the basis of the measurement results on the respective emission light of the first to third light emitting elements 51 to 53, corrects the reference values of the duty ratios to be set in accordance with the command information obtained by the receiving section 61, and performs the PWM drive on the first to third light emitting elements 51 to 53, it is possible to suppress the occurrence of a variation in the color shade of the mixed light.

Further, in the present embodiment, since the correction information is stored for each of the colors of the mixed light to be emitted by the light emitting devices 3, it is possible to perform a high precision light control according to each of the colors.

Further, in the present embodiment, since the correction information is set on the basis of the results measured by using the driving IC 6 in conjunction with the first to third light emitting elements 51 to 53 as a product, it is possible to obtain the correction information allowing for the manufacturing variations in the driving section 62 of the driving IC 6, and it is therefore possible to higher precision suppress the occurrence of a variation in the color shade of the mixed light.

Second Embodiment (Light Emitting Device Configuration)

Figure 7:
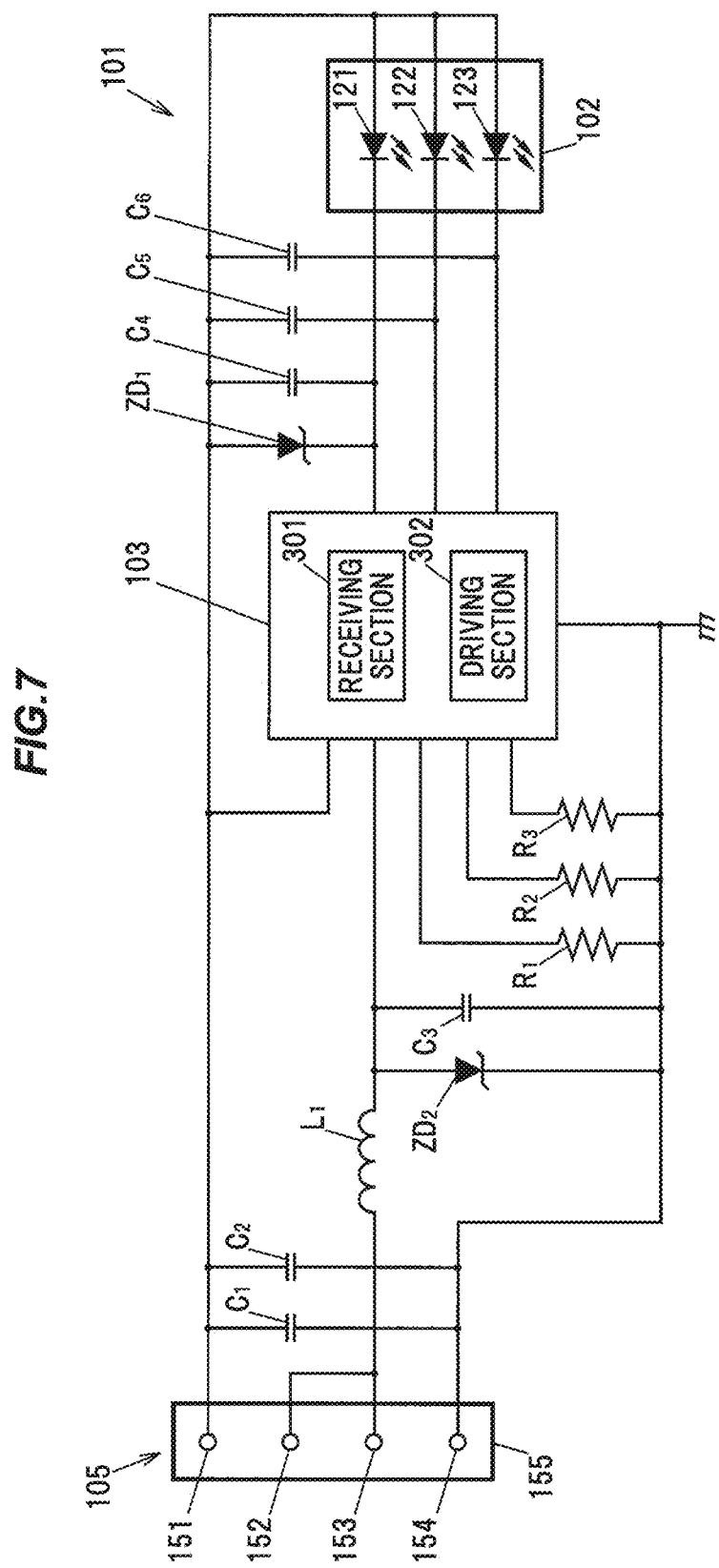
FIG. 7 is a circuit diagram showing a circuit configuration example of the light emitting device according to the second embodiment.

FIGS. 6A and 6C are perspective views showing a light emitting device 101 according to a second embodiment of the present invention, while FIG. 6B is a side view showing the light emitting device 101 according to the second embodiment. FIG. 7 is a circuit diagram showing a circuit configuration example of the light emitting device 101 according to the second embodiment.

The light emitting device 101 is designed to be used for illumination of a vehicle interior of a vehicle (an automobile), for example, and is able to emit light of an emission color specified by a user such as a driver and the like. The user is able to select and specify an emission color by touch operation on a touch panel display of a car navigation system, for example. The command information indicating the specified light emission color is transmitted to the light emitting device 101 via an in-vehicle network, such as a CAN (controller area network) or an LIN (local interconnect network), for example.

The light emitting device 101 is being configured to include a light emitting module 102, which includes a plurality of light emitting elements (LEDs) each having a different chromaticity of emission light, a driving IC 103, which is being configured to drive the light emitting module 102, a printed circuit board 104, which is being mounted with the light emitting module 102 and the driving IC 103, and a connector 105. Further, the light emitting device 101 is being configured to include capacitors C1 to C5, resistors R1 to R3, zener diodes ZD1 and ZD2, and an inductor L1, as other passive elements. The printed circuit board 104 is being configured as a two-layered solid substrate, which is being formed with wiring patterns made of a copper foil on both sides, respectively, of a flat plate-like shape base member 141 made of an insulative resin such as a glass epoxy or the like.

The light emitting module 102 is being configured to include a first light emitting element 121 to emit red light, a second light emitting element 122 to emit green light, and a third light emitting element 123 to emit blue light. The first to third light emitting elements 121 to 123 are being mounted on an element substrate 124, and the element substrate 124 is being accommodated in a housing 125. Further, the light emitting module 102 is being configured to include six lead terminals 126, which are being formed to protrude from the housing 125, and these lead terminals 126 are being connected to respective anodes and cathodes of the first to third light emitting elements 121 to 123, respectively. The first to third light emitting elements 121 to 123 are being configured to emit light on receipt of an electric current to be supplied from the driving IC 103. The light emitting device 101 is being configured to emit mixed light, as illumination light, produced by mixing light emitted from the first to third light emitting elements 121 to 123 together.

The driving IC 103 is being configured to include a receiving section 301 to obtain the command information on the mixed light by communication via an in-vehicle network, and a driving section 302 to perform a PWM drive on the first to third light emitting elements 121 to 123 on the basis of that command information. The receiving section 301 and the driving section 302 are operated by a microprocessor executing a prestored program, for example. Further, the driving IC 103 is being configured in such a manner that its IC chip is sealed by a package 131 made of a resin or a ceramic, with fourteen lead terminals 132 protruding from the package 131. In the present embodiment, the package 131 is being formed in a rectangular shape, and the fourteen lead terminals 132 are being arranged in two rows in such a manner as to protrude from the two side surfaces (corresponding to the two long edges), respectively, of the rectangular shape package 131.

The connector 105 is being configured to include first to fourth connector pins 151 to 154, and a holder 155 made of a resin. The first to fourth connector pins 151 to 154 are being connected to four lands 144, respectively, which are being provided in an end portion of the printed circuit board 104. The first connector pin 151 is being configured as a power supply terminal to supply electric power to the light emitting device 101. The second connector pin 152 and the third connector pin 153 are being configured as communication terminals to transmit a communication signal to the driving IC 103 via the inductor L1. The receiving section 301 of the driving IC 103 is being configured to receive this communication signal. The fourth connector pin 154 is being configured as a ground terminal and is electrically being grounded.

FIG. 8A is a plan view showing a wiring pattern on a first mounting surface 104a of the printed circuit board 104, and FIG. 8B is a plan view showing a wiring pattern on a second mounting surface 104b of the printed circuit board 104 when viewed through a base member 141 from a first mounting surface 104a side. In FIGS. 8A and 8B, the wiring patterns are being shown in gray, in which parts of the wiring patterns, which are being covered with an insulating film such as a solder resist or the like are being shown in light gray, while a plurality of pads 142, a plurality of through hole vias 143 and the four lands 144, which are not being covered with that insulating film, are being shown in dark gray. The lead terminals 126 and 132 of the light emitting module 102 and the driving IC 103, and the respective electrodes of the passive elements are being soldered to the plurality of pads 142, respectively.

The printed circuit board 104 is formed with nine of the through hole vias 143. These through hole vias 143 are being subjected to a copper plating on an inner surface of a respective through hole passing through the base member 141, to electrically connect the wiring pattern on the first mounting surface 104a and the wiring pattern on the second mounting surface 104b.

The light emitting module 102 is being mounted on the first mounting surface 104a, while the driving IC 103 is being mounted on the second mounting surface 104b. In FIGS. 8A and 8B, the outlines of the mounted electronic components are being indicated by a solid line. Further, in FIG. 8A, the outline of the driving IC 103 viewed from the first mounting surface 104a side is being indicated by a broken line, while in FIG. 8B, the outline of the light emitting module 102 projected on the second mounting surface 104b is being indicated by a broken line.

(Operation of the Light Emitting Device 101)

In the light emitting device 101 configured as described above, the receiving section 301 of the driving IC 103 receives the command information on the mixed light at a predetermined time interval, and the driving section 302 sets a duty ratio in the PWM drive for the light emitting elements 121 to 123 in accordance with that received command information. The duty ratio refers to the proportion of a period of time for which the electric current is being supplied within a unit time, in such a manner that, at a duty ratio of 100%, the electric current is constantly being supplied, while at a duty ratio of 0%, no electric current is supplied.

The light emission colors to be indicated in the command information include neutral colors such as yellow green, purple and the like, as well as the primary colors of red, green and blue, for example. The duty ratio for the first light emitting element 121 is set to be higher with increasing Cx value of the chromaticity coordinates in the CIE 1931 chromaticity diagram for the light emission colors, and the duty ratio for the second light emitting element 122 is set to be higher with increasing Cx value. Further, the duty ratio for the third light emitting element 123 is set to be higher with decreasing total value of the Cx value and the Cy value.

The first to third light emitting elements 121 to 123 emit their respective light of a brightness dependent on the electric current to be supplied from the driving IC 103, and their respective light colors are mixed and emitted from the light emitting module 102. The emitted mixed light is diffused by a lens or guided by a linear shape light guide to illuminate the vehicle interior, for example.

(Heat Dissipating Structure of the Light Emitting Device 101)

The light emitting module 102 radiates heat resulting from the light emissions of the first to third light emitting elements 121 to 123, while the driving IC 103 also radiates heat resulting from the communication of the receiving section 301 and the electric current supply of the driving section 302. For this reason, if those two components, i.e., the light emitting module 102 and the driving IC 103 are arranged one on top of the other on the same mounting surface, a further rise in the temperature of the upper side located component is caused by the influence of the heat of the lower side located component. In the present embodiment, the occurrence of a mutual influence between the respective heat of the light emitting module 102 and the driving IC 103 is being suppressed by heat dissipating structures of the following (1) to (4).

(1) Dispersion with the Mounting Surfaces (the First Mounting Surface 104a and the Second Mounting Surface 104b)

In the present embodiment, the light emitting module 102 is being mounted on the first mounting surface 104a, while the driving IC 103 is being mounted on the second mounting surface 104b corresponding to the back side of the first mounting surface 104a. This makes it possible to suppress the occurrence of a direct influence of the heat of one component on the other component being located on the upper side, as described above, for example. Further, for example, when the light emitting device 101 is used while remaining accommodated in a case, mounting the light emitting module 102 and the driving IC 103 on the same mounting surface results in those two components being arranged in a narrow range of the space within that case partitioned by the printed circuit board 104, therefore leading to the occurrence of a mutual influence between the respective heat of those two components. In the present embodiment, since the mounting surface being mounted with the light emitting module 102 and the mounting surface being mounted with the driving IC 103 are separate from each other, the mutual influence between the respective heat of those two components is mitigated.

(2) Arrangement of the Lead Terminals 126 and 132

The light emitting module 102 and the driving IC 103 are being arranged in such a manner that the locations of their respective lead terminals 126 and 132 are not overlapped on the front and back sides of the printed circuit board 104. More specifically, as shown in FIGS. 8A and 8B, the light emitting module 102 and its lead terminals 126 are being arranged in such a manner as to be located between the two rows of the plurality of two-row arranged lead terminals 132 of the driving IC 103. This arrangement of the lead terminals 126 and 132 is being designed to allow for the fact that the heat of the light emitting module 102 is partially dissipated from the lead terminals 126 to the printed circuit board 104 while the heat of the driving IC 103 is partially dissipated from the lead terminals 132 to the printed circuit board 104. That is, if these lead terminals 126 and 132 are arranged in such a manner as to be overlapped in the same locations on the front and back sides of the printed circuit board 104, the temperature of the printed circuit board 104 becomes high locally in portions located between the lead terminals 126 and 132, leading to a disruption in heat dissipation, but in the present embodiment, since portions of the lead terminals 126 of the light emitting module 102 being contiguous to the printed circuit board 104 and portions of the lead terminals 132 of the driving IC 103 being contiguous to the printed circuit board 104 are being separated from each other, the heat dissipation to the printed circuit board 104 is facilitated, as compared to when the lead terminals 126 and 132 are being arranged in the same locations on the front and back sides of the printed circuit board 104.

(3) Arrangement of the Through Hole Vias 143

In the present embodiment, although the printed circuit board 104 is being provided with the nine through hole vias 143, these through hole vias 143 are not being provided in an opposite region of the first mounting surface 104a to the light emitting module 102 (a region indicated by the solid line for the light emitting module 102 in FIG. 8A and a region indicated by the broken line for the light emitting module 102 in FIG. 8B). Since the through hole vias 143 are being designed in such a manner as to be subjected to a copper plating on the inner surfaces of their respective through holes passing through the base member 141 to electrically connect the wiring pattern on the first mounting surface 104a and the wiring pattern on the second mounting surface 104b as described above, heat transfer between the first mounting surface 104a and the second mounting surface 104b is highly likely to occur via the through hole vias 143. For this reason, by providing no through hole via 143 in the opposite region to the light emitting module 102, it is possible to suppress the occurrence of heat transfer from the light emitting module 102 to the driving IC 103 and the occurrence of heat transfer from the driving IC 103 to the light emitting module 102.

(4) Shape of the Wiring Pattern on the First Mounting Surface 104a

As shown in FIG. 8A, the wiring pattern on the first mounting surface 104a connected by soldering to the lead terminals 126 of the light emitting module 102 is being formed in a planar shape up to an outer side of such a region corresponding to the back side of the driving IC 103 as to be indicated by a broken line in FIG. 8A. This results in heat transfer of the heat of the light emitting module 102 from the lead terminals 126 to that wiring pattern, thereby accelerating the heat dissipation. That is, since the wiring pattern is made of the metal conductor, the heat conductivity of the wiring pattern is higher than that of the base member 141 made of a resin such as a glass epoxy or the like, so forming the wiring pattern as described above makes it possible to allow the heat to diffuse up to the outer side of the region to which the heat is directly transferred by conduction, and dissipate in a wide area. Note that because a heat radiation amount of the light emitting module 102 is larger than a heat radiation amount of the driving IC 103, and a projected area of the light emitting module 102 on the first mounting surface 104a is wider than a projected area of the driving IC 103 on the second mounting surface 104b, it is possible to effectively suppress the occurrence of overheating of the light emitting module 102 by forming the shape of the above wiring pattern.

Note that the wiring pattern connected to all the lead terminals 126 of the plurality of lead terminals 126 of the light emitting module 102 may be not formed in a planar shape up to the outer side of the region corresponding to the back side of the driving IC 103, and that the above advantageous effect can be obtained by forming the wiring pattern connected to at least some of the lead terminals 126 in a planar shape up to the outer side of the region corresponding to the back side of the driving IC 103.

(Light Emitting Device 101 Producing Method)

In producing the light emitting device 101, the driving IC 103 and the capacitor C3 to be mounted on the second mounting surface 104b are reflow soldered to the second mounting surface 104b, and thereafter the light emitting module 102 and the other electronic components to be mounted on the first mounting surface 104a are reflow soldered to the first mounting surface 104a. Here, the reflow soldering refers to such a method as to, using a metal mask, apply a paste-like cream solder (a solder paste) to the pads 142 and after electronic component mounting, melt that solder paste in a high temperature reflow furnace to perform solder joining. In the present embodiment, a temperature of the furnace when the electronic components to be mounted on the first mounting surface 104a are soldered to the first mounting surface 104a is set at lower than a temperature of the furnace when the electronic components to be mounted on the second mounting surface 104b are soldered to the second mounting surface 104b. This soldering temperature setting is being designed to allow for the fact that the light emitting module 102 is more adversely affected by the heat in production than the driving IC 103.

That is, in the present embodiment, since the mounting surface for the light emitting module 102 and the mounting surface for the driving IC 103 are separate from each other, it is possible to provide the difference between the respective soldering temperatures for the light emitting module 102 and the driving IC 103, and it is therefore possible to securely solder each electronic component while suppressing the occurrence of damage to the light emitting module 102 due to the heat. Further, since the second reflow heating temperature for the first mounting surface 104a is set at lower than the first reflow heating temperature for the second mounting surface 104b, it is possible to prevent the solder melted by the first reflow heating from being melted by the second reflow heating.

Note that, although in the present invention, the light emitting device 101 is being defined by its production process, such definition is considered permissible because of the existence of so-called impossible or impractical circumstances on this matter. That is, it is utterly not practical but impossible to define in terms of the structure and properties of the light emitting module 102 that the light emitting module 102 is being soldered at a temperature lower than the driving IC 103 soldering temperature. For this reason, it is considered permissible that the light emitting device 101 produced as described above is defined by its production process.

Although the embodiments of the present invention have been described above, the present invention is not limited to the above-described embodiments, but various modifications can be implemented without departing from the spirit of the invention. Further, any combinations of the constituent elements of the above-described embodiments can be made without departing from the spirit of the invention.

For example, it is possible to apply the heat dissipating structure of the light emitting device 101 according to the second embodiment to the light emitting device 3 according to the first embodiment. For example, by configuring the back side of the light emitting module 5 mounting surface of the substrate 4 as the mounting surface for the driving IC 6, it is possible to mitigate the mutual influence between the respective heat of the light emitting module 5 and the driving IC 6.

In addition, by employing a circuit configuration analogous to that of the light emitting device 101 as a specific circuit configuration for the light emitting device 3, in other words, by using a circuit including the driving IC 6 in place of the driving IC 103 of the light emitting device 101 as a circuit for the light emitting device 3, it is possible to obtain the same heat dissipating effect in the light emitting device 3 as in the light emitting device 101. For example, by arranging the light emitting module 5 and the driving IC 6 in such a manner that the locations of their respective lead terminals are not overlapped on the front and back sides of the substrate 4, it is possible to facilitate the heat dissipation of the respective heat of the module 5 and the driving IC 6 to the substrate 4.

In addition, by providing no through hole via, which connects the wiring patterns on the front and back sides of the substrate 4, in the opposite region of the light emitting module 5 mounting surface of the substrate 4 to the light emitting module 5, it is possible to suppress the occurrence of heat transfer from the light emitting module 5 to the driving IC 6 and the occurrence of heat transfer from the driving IC 6 to the light emitting module 5.

In addition, by forming the wiring pattern on the light emitting module 5 mounting surface of the substrate 4 connected by soldering to the lead terminals of the light emitting module 5 in a planar shape up to an outer side of a region corresponding to the back side of the driving IC 6, it is possible to effectively suppress the occurrence of overheating of the light emitting module 5.

In addition, by reflow soldering the driving IC 6 to the driving IC 6 mounting surface of the substrate 4 and thereafter reflow soldering the light emitting module 5 to the light emitting module 5 mounting surface of the substrate 4 in such a manner as to set a light emitting module 5 soldering temperature at lower than a driving IC 6 soldering temperature, it is possible to prevent the solder melted by the first reflow heating from being melted by the second reflow heating.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

DESCRIPTIONS OF THE REFERENCE CHARACTERS

3 Light emitting device
51 First light emitting element
52 Second light emitting element
53 Third light emitting element
61 Receiving section
62 Driving section
63 Storing section
101 Light emitting device
102 light emitting module
121 to 123 First to third light emitting elements
103 Driving IC
301 Receiving section
302 Driving section
132 Lead terminals
104 Printed circuit board
143 Through hole via
104a First mounting surface
104b Second mounting surface

What is claimed is:

1. A light emitting device, which includes a plurality of light emitting elements each having a different chromaticity of emission light, to emit mixed light produced by mixing the respective emission light of the plurality of light emitting elements together, comprising:
    a receiving section to obtain command information on the mixed light;
    a driving section to perform a PWM drive on the plurality of light emitting elements on the basis of the command information; and
    a storing section to store correction information to be set on the basis of measurement results on the respective emission light of the plurality of light emitting elements,
    wherein the driving section is being configured in such a manner as to, on the basis of the correction information, correct a duty ratio in the PWM drive to be set in accordance with the command information, and perform the PWM drive on the plurality of light emitting elements.

2. The light emitting device according to claim 1, wherein the plurality of light emitting elements include at least three light emitting elements each having a different chromaticity of emission light, and the storing section is being configured in such a manner as to store the correction information for each of colors of the mixed light to be emitted.

3. The light emitting device according to claim 1, wherein the correction information is to be measured by using the driving section in conjunction with the plurality of light emitting elements.

4. A light emitting device producing method, which is designed to emit mixed light produced by mixing together respective emission light of a plurality of light emitting elements each having a different chromaticity of emission light, comprising:
    a first step of producing the plurality of light emitting elements;
    a second step of measuring the respective emission light of the plurality of light emitting elements produced, and setting correction information on the basis of results on that measurement; and
    a third step of storing the correction information in a storing section configured to be able to be accessed by a driving section configured to drive the plurality of light emitting elements.

5. The light emitting device producing method according to claim 4, wherein the plurality of light emitting elements include at least three light emitting elements each having a different chromaticity of emission light, and the second step is performed to set the correction information for each of colors of the mixed light to be emitted.

6. The light emitting device according to claim 1, further comprising:
    a light emitting module, which is being mounted with the plurality of light emitting elements thereon;
    a driving IC, which includes the receiving section, the driving section, and the storing section; and
    a printed circuit board, which is being mounted with the light emitting module and the driving IC thereon,
    wherein the light emitting module is being mounted on a first mounting surface of the printed circuit board, while the driving IC is being mounted on a second mounting surface of the printed circuit board corresponding to a back side of that first mounting surface.

7. The light emitting device according to claim 6, wherein the light emitting module and the driving IC are being arranged in such a manner that their respective lead terminals are not overlapped on front and back sides of the printed circuit board.

8. The light emitting device according to claim 6, wherein the printed circuit board includes a plurality of through hole vias, which are connecting a wiring pattern on the first mounting surface and a wiring pattern on the second mounting surface together, in such a manner that the plurality of through hole vias are not being provided in a region of the first mounting surface lying opposite the light emitting module.

9. The light emitting device according to claim 6, wherein a wiring pattern on the first mounting surface, which is being connected by soldering to a lead terminal of the light emitting module, is being formed in a planar shape up to an outer side of a region corresponding to a back side of the driving IC.

10. The light emitting device according to claim 6, wherein the light emitting module is being reflow soldered to the first mounting surface after reflow soldering of the driving IC to the second mounting surface, in such a manner that a temperature at which the light emitting module is soldered to the first mounting surface is set at lower than a temperature at which the driving IC is soldered to the second mounting surface.

* * * * *